US009836760B2

United States Patent
Greenzeiger et al.

(10) Patent No.: US 9,836,760 B2
(45) Date of Patent: Dec. 5, 2017

(54) REPRESENTATIVE USER JOURNEYS FOR CONTENT SESSIONS

(71) Applicant: Apple Inc., Cupertino, CA (US)

(72) Inventors: Michael Froimowitz Greenzeiger, Sunnyvale, CA (US); Mehul K. Sanghavi, Sunnyvale, CA (US); Ravindra M. Phulari, San Jose, CA (US); Ryan S. Mehlmauer, San Jose, CA (US); Steven C. Bredenberg, Campbell, CA (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 14/169,478

(22) Filed: Jan. 31, 2014

(65) Prior Publication Data

US 2015/0220970 A1    Aug. 6, 2015

(51) Int. Cl.
G06Q 30/00 (2012.01)
G06Q 30/02 (2012.01)

(52) U.S. Cl.
CPC .................. G06Q 30/0244 (2013.01)

(58) Field of Classification Search
None
See application file for complete search history.

(56) References Cited

U.S. PATENT DOCUMENTS

| | | | |
|---|---|---|---|
| 6,873,314 B1 | 3/2005 | Campbell | |
| 2010/0030618 A1* | 2/2010 | Green | G06Q 30/0201 705/7.29 |
| 2011/0022945 A1 | 1/2011 | Yang | |
| 2011/0029393 A1 | 2/2011 | Apprendi et al. | |
| 2012/0204094 A1 | 8/2012 | Liang | |
| 2012/0215602 A1* | 8/2012 | Ramer | G06F 17/30867 705/14.13 |
| 2013/0080362 A1* | 3/2013 | Chang | G06Q 30/0255 706/21 |
| 2013/0304906 A1 | 11/2013 | Yavilevich et al. | |
| 2015/0142888 A1* | 5/2015 | Browning | H04L 12/1831 709/204 |

FOREIGN PATENT DOCUMENTS

JP         2013020136 A   *  1/2013   ............ G09F 19/00

OTHER PUBLICATIONS

Friedlein, Ashley. Digital Marketing and Ecommerce Trends and Predictions for 2014 (2014). Retrieved online Aug. 14, 2017. http://www.queensu.ca/artsci/sites/default/files/digital-marketing-and-ecommerce-trends-and-predictions-for-2014.pdf.*

* cited by examiner

Primary Examiner — James A Reagan
(74) Attorney, Agent, or Firm — Polsinelli LLP

(57) ABSTRACT

Systems, methods, and computer-readable storage media for determining user journeys during presentations of content. The system first determines an average time spent for sessions associated with a presentation of content. Next, the system identifies a representative group of sessions from the sessions by identifying each of the sessions having a respective time spent within a statistical range from the average time spent for the sessions. The system then determines a most common path of events from the representative group of sessions to yield a most common user journey associated with the presentation of content.

25 Claims, 8 Drawing Sheets

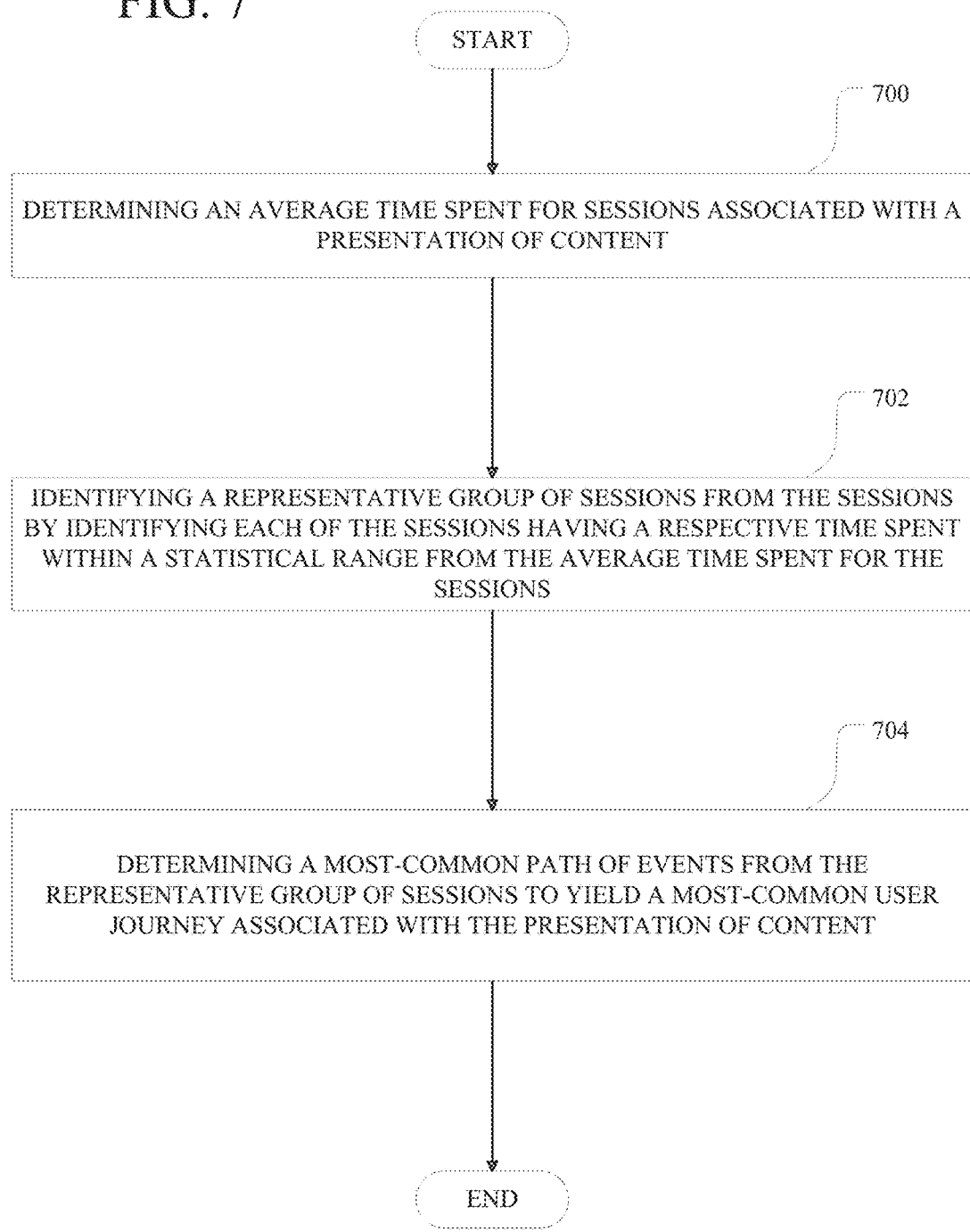

REPRESENTATIVE USER JOURNEYS FOR CONTENT SESSIONS

TECHNICAL FIELD

The present technology pertains to presenting invitational content, and more specifically pertains to determining user journeys for sessions of invitational content.

BACKGROUND

Mobile advertising is widely used by advertisers to market their products via mobile devices. Given the widespread availability of mobile devices, mobile advertising can be an extremely effective way for advertisers to reach a wide mass of potential customers and induce numerous users to purchase their products. By targeting mobile users with effective mobile advertisements, advertisers can yield large financial returns from their mobile advertisements. Not surprisingly, many advertisers continuously measure the performance of their advertisements to understand how, if necessary, they can optimize their advertisements for a better performance. Moreover, advertisers, creative agencies and designers of rich media advertising units are often interested in understanding and visualizing how users interact with their advertising units.

Current solutions for studying user interactions are typically limited to browsing through large numbers of sessions, or simply studying statistics of what choices users make at particular points within an advertising experience. Unfortunately, these methods are inefficient and fail to illustrate the user experience in an accurate and comprehensive manner. In addition, many of the details of the interactions of a user are lost in the numbers and statistics under the present solutions. Yet such details can be extremely informative and helpful in guiding and optimizing the user experience.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for determining user journeys during presentations of content. The system first determines an average time spent for sessions associated with a presentation of content. The sessions can include any number of sessions associated with the presentation of content and/or the content delivery system. In some cases, the sessions can include one or more groups of sessions selected as input based on one or more factors, such as characteristics, segments, targeting values, etc. The presentation of content can include video, audio, text, or any other type of media content. The average time spent for the sessions can be calculated based on a respective time spent for each of the sessions. For example, the time spent for each of the sessions can be combined, and the combined value used to calculate the average time spent based on the number of sessions included in the calculation.

Next, the system identifies a representative group of sessions from the sessions by identifying each of the sessions having a respective time spent within a statistical range from the average time spent for the sessions. For example, the system can calculate a statistical distribution of time spents associated with the sessions, and select a predefined range, such as 10%, from the average time spent as indicated in the distribution, to select the representative group of sessions. The segment of sessions or percentile range within the distribution used to identify the representative group of sessions can be relative to the average time spent or any other point(s) in the distribution, such as the end points representing the lowest and highest percentiles, for example. Moreover, the segment of sessions or percentile range can vary based on specific goals or applications.

The representative group of sessions can be a subgroup of the sessions used as input. For example, the representative group of sessions can be a subgroup of the sessions having the highest likelihood of including the most common path of events for the particular presentation of content. In this sense, the representative group of sessions can refer to the subgroup of sessions estimated or projected to be the most representative sessions of the most common paths of the sessions or user trajectories during the presentation of content.

Next, the system determines a most common path of events from the representative group of sessions to yield a most common user journey associated with the presentation of content. The system can analyze the statistics associated with each of the events in the representative group of sessions to determine the most common events within the representative group of sessions. The system can identify the path corresponding to each of the sessions in the representative group of sessions and compare the paths to determine the most common path of events. The most common user journey can be based on the most common path of events, and can represent the most common interactions during the presentation of content.

In some embodiments, the system can then generate a visual representation of the most common user journey. Here, the system can present the most common path of events via a graphical user interface, and represent different events and information using various graphical elements, such as icons, images, screenshots, videos, simulations, taxonomies, etc. The system can also include visual representations of different paths and sessions, and visually depict the various details and relationships of items in one or more user journeys.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an exemplary method embodiment; and

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accurate and detailed representations of typical user activities and paths in a session of content. Disclosed are systems, methods, and non-transitory computer-readable storage media for determining user journeys in presentations of content. A brief introductory description of an exemplary configuration of devices and a network is disclosed herein. A detailed description of user journeys and exemplary variations will then follow. These variations shall be described herein as the various embodiments are set forth. The disclosure now turns to FIG. 1.

Figure 1:
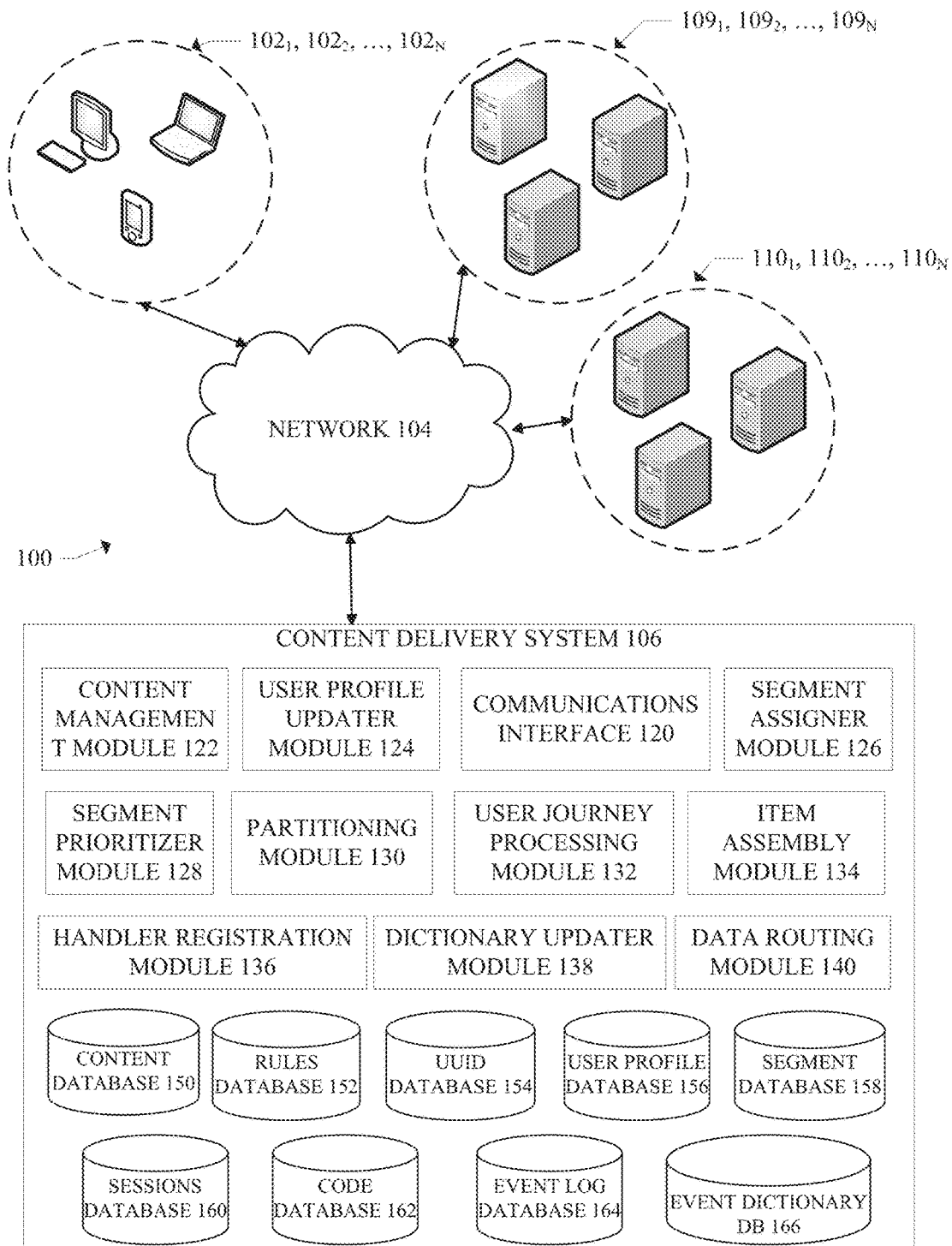
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, ..., $109_n$ (collectively "109") and content from one or more secondary content providers $110_1$, $110_2$, ..., $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can also include a sessions database 160. The sessions database 160 can store session information collected for one or more user sessions. For example, the sessions database 160 can store sessions of content presented at user terminals 102. In some cases, the sessions database 160 can store time spent information for sessions of content. For example, the sessions database 160 can store a record for each session of content at the user terminals 102, and the time spent measured for each of the sessions. The time spent can include the length of a session, the amount of time spent by the user engaged in the content presented in a session, the amount of active engagement in the session, the amount of passive engagement in the session, the absolute length of time of a session, etc. Such time spent information can be stored in the sessions database 160. Other time spent information, such as average time spent for one or more sessions or adjusted time spent for one or more sessions, can also be stored in the sessions database 160.

The sessions database 160 can store any number of sessions used or selected as input by the user journey processing module 132, as further described below, or any other module, component, and/or device. Moreover, the sessions in the sessions database 160 can be stored in specific groupings, segments, categories, clusters, and/or partitions, based on one or more factors and characteristics, as further described herein. In some configurations, groups or clusters of sessions and corresponding session information, such as time spent information, can be stored in the sessions database 160 according to session clusters, segments, or groupings used by the user journey processing module 132 to process or generate user journey information. Further, the sessions database 160 can also store session events and related information, such as user activity and inputs, as well as user journeys.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

In some embodiments, the content delivery system 106 can include a partitioning module 130. The partitioning module 130 can perform partitioning tasks based on the configuration of the content delivery system 106. In some configurations, the partitioning module 130 can divide content, such as a presentation of content, or a user session into partitions of time. In other configurations, the partitioning module 130 can divide sessions of content into partitions or subgroups. While FIG. 1 illustrates the partitioning module 130 as a component of the content delivery system 106, one of ordinary skill in the art will readily recognize that the partitioning module 130 can be separate from the content delivery system 106. For example, in some cases, the partitioning module 130 can be a component of content provider $109_i$, content provider $110_i$, user terminal $102_i$, or any other server or client device.

In some embodiments, the content delivery system 106 can include a user journey processing module 132. The user journey processing module 132 can take a group of sessions as input and generate one or more user journeys as further described below. In some configurations, the user journey can include a most common path of events calculated from the group of sessions used as input. The user journey processing module 132 can process and analyze session information and time spent information to generate the user journey. Moreover, the user journey processing module 132 can process time spent information and determine an average time spent for the group of sessions, as well as a statistical distribution of time spents associated with the group of sessions. The user journey processing module 132 can then use the average time spent and/or the statistical distribution of time spents to generate a user journey. For example, the user journey processing module 132 can identify a number of sessions having time spents within a predefined range of the average time spent and use the identified sessions to generate the user journey based on the most common path of events for the identified sessions. To this end, the user journey processing module 132 can also process and analyze events, such as views, videos, and gestures, associated with one or more of the input sessions, to identify event statistics and metrics, for example.

The user journey processing module 132 can also use the user journeys and/or user path information to generate visual representations of the information, such as decision trees or route maps based on user journey information. Thus, in some configurations, the user journey processing module 132 can generate and/or modify a graphical user interface based on derived user journey information.

While the content delivery system 106 is presented with specific components, it should be understood by one skilled in the art, that the architectural configuration of system 106 is simply one possible configuration and that other configurations with more or less components are also possible.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

To implement the various embodiments of the present technology, the content delivery system 106 can include additional components. For example, one aspect of the present technology can implement a standardized analysis module for events. To this end, the content management system 106 can further include an item assembly module 134. The item assembly module 134 can be configured to operate after selection of an invitational content item discussed above.

In particular, the item assembly module 134 can be configured to supplement existing reporting capabilities associated with an invitational content item. For example, in some cases an item of invitational content delivered to one or user devices 102 can include a JavaScript-based engine or module that is designed to listen or monitor for events at the device and thereafter cause messages to be transmitted back to the content management system 106. This engine or module can be hard-coded in the item. The present technology contemplates supplementing this module with an analysis module that can be updated over time. Thus, no updating of the invitational content item is required. Further, the present disclosure contemplates a standard reporting from such a module. Thus, the module can be added to any item of invitational content, regardless of its features.

In operation, the item assembly module 134 can intercept or otherwise obtain the item of invitational content prior to delivery to the end user at one of devices 102. Thereafter, the item assembly module 134 can combine current code sections and data for the analysis module, insert them into the selected item, and allow the item to be delivered. The code sections can be retrieved from a code database 162. The code database 162 can store various types of code sections, including code sections for identifying events at a one of the devices (e.g., event listeners), code sections for routing data regarding such events, based on routing data, to an appropriate event handler, and the code sections for the event handlers. The event handlers can then generate messages regarding user engagement. The routing data can be embodied in the form of an event dictionary, which can be stored and be retrieved from an event dictionary database 166.

The entries in the event dictionary can correspond to events, such as a page view at the end user device, a trackable view type generated at the end user device, a gesture detected at the end user device, a media item event at the end user device, or a system-level event at the end user device.

The present technology contemplates that the contents of the analysis module being inserted into invitational content can vary over time. Accordingly, other components can be provided in content delivery system 106 to facilitate such updates. The present technology contemplates that as developers generate new invitational content, such developers can also identify new types of events to monitor and can also generate new types of event handlers for processing data associated with such events into a useful message. Accordingly, the present disclosure contemplates providing a handler registration module 136 to facilitate this process. In particular, the developer can identify to the content delivery system 106 that a new event handler is being provided. For example, via user terminals 102, the developers can access the handler registration module 136 by providing the event handler to be registered and an identification of the types of events associated with the event handler. Thereafter, the handler registration module can store the event handler in the code database 162.

Working in concert with the handler registration module 136 can be a dictionary updater module 138. As discussed above, an event dictionary can be utilized by an analysis module to route event data to an appropriate event handler. Therefore, the present disclosure contemplates that when an event handler is registered with the handler registration module, contemporaneously a dictionary updater module 138 can utilize information provided during the registration process to create an entry in the event dictionary. For example, the dictionary updater module 138 can update the event dictionary stored in event dictionary database 166.

The present disclosure also contemplates that the content delivery system 106 can receive messages from user terminals 102 regarding user engagement with invitational content. In some embodiments, all messages from user terminals 102 can be routed to a single database, such as event log database 164. However, in other embodiments, the messages can be processed and routed to different locations. For example, content delivery system 106 can include a data routing module 140 that intelligently routes and/or stores messages based on their origin and/or contents. In some particular embodiments, the data routing module 140 can be configured to provide different routing of messages generated via the supplemental analysis module in the invitational content and messages generated via invitational content item, outside of the analysis module, i.e., its native capabilities. The data routing module 140 can cause routing of event messages to different databases, storage locations, or different portions thereof. In some cases, the data routing module 140 can encrypt or otherwise obfuscate the content of the event messages to ensure that certain types of messages are accessible to only certain persons.

The disclosure now turns to an introductory discussion of user journeys. As follows, a user journey can be determined to describe the average, or archetypal, user journey for a content delivery system(s), such as an Ad unit, and/or a certain subpopulation of sessions, such as targeting products; targeting groupings; demographic groupings; groupings with certain performance characteristics, including successful conversions; etc. A system can also use the derived session data or user journey for playback such that an interested party can see what the users who received content from the content delivery system(s) have experienced, and/or how the users interacted with the content delivery system (s) using inputs, such as gestures.

The user journey and/or relevant session data can be derived using sessions as input. For example, the system can use as input a subset of sessions from a total number of sessions associated with a content item, a content presentation, and/or a content delivery system(s). The subset of sessions can be defined by a subpopulation being studied. This can include all sessions for a particular system, such as a rich media Ad unit; a subpopulation defined by targeting products or groupings, such as line items, custom user cubes, custom segments, and re-targeting groups; a subpopulation defined by demographic characteristics, such as males of ages 18 to 21; a subpopulation based on key performance indicator (KPI) performance, such as those users who successfully complete a conversion (e.g., a sign-up for a service or a download), those users who achieve particular scores in post-campaign surveys (e.g., surveys for brand recognition, favorability, etc.); or any other method of defining a segment, such as geographic parameters, device parameters, operating system (OS), day parting, users who have visited the same content delivery system more than once, etc.

The user journey can be created as a single composite session. The single composite session can be created as follows.

First, the system can calculate the average time spent for the sessions that are used as input. For example, the system can calculate the average time spent for a specific subset of sessions which, as previously mentioned, can be identified based on a segment of users according to one or more factors or characteristics. Here, the system can calculate the time spent for each session, or receive the time spent information for each session from one or more devices. Once the system has the time spent information for each of the subset of sessions, it can determine the average time spent by dividing the combined time spent measurements by the number of time spent measurements.

Second, the system can then identify the sessions having a respective time spent that is within a specific range from the average time spent. For example, the sessions having a respective time spent within 10% of the average time spent can be selected, and the sessions having a respective time spent that is +/− 10% of the average time spent can be discarded.

Third, the system can calculate the most common path of view and/or video events for the selected or identified sessions (i.e., the sessions having a respective time spent that is within the range from the average time spent).

Fourth, the system can calculate the most common path of gesture events in between each consecutive pair of views/videos in the most common view/video path. This can be one or more gestures. In some cases, this can be a single gesture.

Fifth, the system can add the most common path of view and/or video events to the most common path of gesture events to create a complete user journey path.

Sixth, the system can measure or calculate the average timing between each consecutive pair of events in sessions following the most common user journey path. Here, the events can include, for example, view events, videos, gestures, etc.

Seventh, the system can measure or calculate the average location of each gesture, such as each tap, swipe, shake, pinch, zoom, touch, etc. In some cases, some of the gestures, such as swipes, pinches, and zooms can include multiple points.

Eighth, the system can determine the final user journey path based on the complete user journey path, the average timing between each consecutive pair of events, and the average location of each gesture.

Additionally, the system can cluster the session groupings into characteristic sub-types. In some embodiments, this clustering can be based on an alternate algorithm, as further described below.

First, the system can calculate the most common paths of view and video events across the entire sample. Those which individually constitute at least a given threshold of overall sessions (e.g., 5%) can be retained.

Second, for each path, the system can calculate the most common path of gesture events in between each consecutive pair of views or videos in the most common path of view and video events. In some cases, this can be a single gesture.

Third, the system can add the most common path of gesture events to the most common path of view and video events to generate a series of complete user journey paths.

Fourth, for each user journey path, the system can measure the average timing between each consecutive pair of events (e.g., views, videos, or gestures) in sessions following that path.

Fifth, for each user journey path, the system can measure the average location of each gesture (e.g., each tap, swipe, shake, pinch, zoom, etc.).

Sixth, the system can obtain the final user journey. The final user journey can be composed of the complete user journey paths, the average timings between consecutive pairs of events, and the average gesture location information of each gesture, along with the percentage of overall sessions which follow that path and the overall KPI for that subset of paths (AVGTS, V/V, Conversion Rate, etc.).

Moreover, the user journey and results from the user journey derivation process can be displayed using one or more display schemes. Below are a few non-limiting example schemes for displaying the user journey and/or results. These examples are for illustration purposes, as other schemes are also contemplated herein.

User Journey Playback Module

A user journey playback module can take the complete user journeys, including all the events and gesture locations listed above, as input along with the Ad unit itself. The module can allow for the selection of one or more user journeys from a database of pre-computer user journeys. When a user journey is selected for playback, the gesture events needed to drive the Ad unit to follow the precise user journey selected can be transmitted with the timing to the Ad unit. Additionally, a visual layer can be overlaid on the Ad unit, showing the gestures with their corresponding timings and locations. In this gesture layer, the taps can be displayed using shapes, the swipes can be displayed using moving shapes or stationary arrows, the pinches or zooms can be displayed with multiple moving shapes or stationary arrows, and the shakes can be displayed using a visual shake effect or other location-independent representation.

Decision Tree

The decision tree can present the complete user journeys using an acyclic, hierarchical visual representation with multiple nodes, each of which can indicate a step (view or video) in the user journey. The nodes can be names or screen shots of the views and videos in question. The nodes can be connected via arrows showing the paths followed, with the name or icon representing the gesture(s) superimposed on the arrow. Additionally, the percent of sessions which follow the complete path that terminates at each node, along with the average KPI (AVGTS, V/V), can also be shown at the node.

Route Map

The route map can be a cyclic graph of the Ad unit using a spatial (map) metaphor to indicate each possible view or video in the Ad. For each user segment included in the representation (any of the above segments list, e.g., different line items on the campaign), a curvilinear route can be shown in a different color, connecting the views or videos in the single user journey most representative of that user segment. Along the route, the names or icons of the gestures on that path can be superimposed on the route. The route map can help in identifying a probable journey a user segment may undertake with slight modifications to the Ad unit.

The user journey analysis can be performed with the data available at the end of a campaign. However, in some cases, the user journey analysis can also be performed even when the campaign is mid-flight, for example. Here, the amount of data can be sufficient to provide an insight into the probable paths that the desired user segment may take. This can also be verified by introducing different Ad units simultaneously—thus providing A/B bucket testing data. The route map can also be useful in identifying unexpected terminal events, where users seem to exit the Ad experience with no clear intent. These insights can help identify potential issues with the Ad unit, which can be corrected and re-deployed.

As one of ordinary skill in the art will readily recognize, other display schemes and strategies, such as a heat map scheme, can also be used with the user journey analysis. However, the schemes presented above are provided for illustration purposes and are non-limiting.

Moreover, in calculating user journeys, the system can record events from a session using an event recording layer, for example. Further, events can be monitored, collected, analyzed, updated, and stored as previously noted in the discussion of FIG. 1, above.

As previously indicated, the data collected in a campaign can be used to determine the most common user path or user journey. In some cases, however, the data, user path information, and user journeys can also be implemented in various other ways, as illustrated in the non-limiting examples described below.

In some cases, once a sufficient amount of data has been collected via a campaign, a representative journey's construct can indicate that there are more than a critical or threshold mass of users who are taking asymmetric paths via the Ad unit. This asymmetry can indicate a deeper and more complex user experience problem. Such problem can then be addressed or alleviated in various ways. For example, an introduction of a mini-tutorial or a guide can be provided in the next iteration of the expanded Ad unit to help or support users and avoid such asymmetric paths.

The asymmetric paths can also indicate issues with information flow and navigation, in terms of decision making or the purchase funnel. For example, an Ad unit which exposes television SKUs may start off with pixel quality and subsequently jump into smart programming. Yet here, users may be looking first for size, second for pixel quality, and finally for cost. The asymmetry in the user flow can thus be used to realign the data seen in the expanded Ad and Ad unit. In some cases, there can also be issues with the way users perceive certain products. For example, selling life insurance may actually be best suited to start with a quote generator instead of upselling on the benefits of life insurance. Here, the initial Ad unit may have tried the flow the other way around, and may not receive the traffic it is actually expecting.

Furthermore, representative journeys can also be good for identifying key or important traffic flow through the Ad unit. However, the other asymmetric or non-representative sessions can be used to create user profiles for niche audiences. This can be especially useful for multi-brand advertisers who are trying to use a large pool of budgets for Run of Network (RON) media to identify the audience segments that may be more inclined to be their primary targets for more premium brands. An example can be hotel and resort chains. Here, a RON Ad at a corporate level of a hotel and resort chain may reveal a small group of users who are interested in browsing premium locations (which may not be frequented by most users). This can lead to a new, smaller, focused hotel and resort campaign for that specific chain that is targeted at this small group of users.

Figure 2:
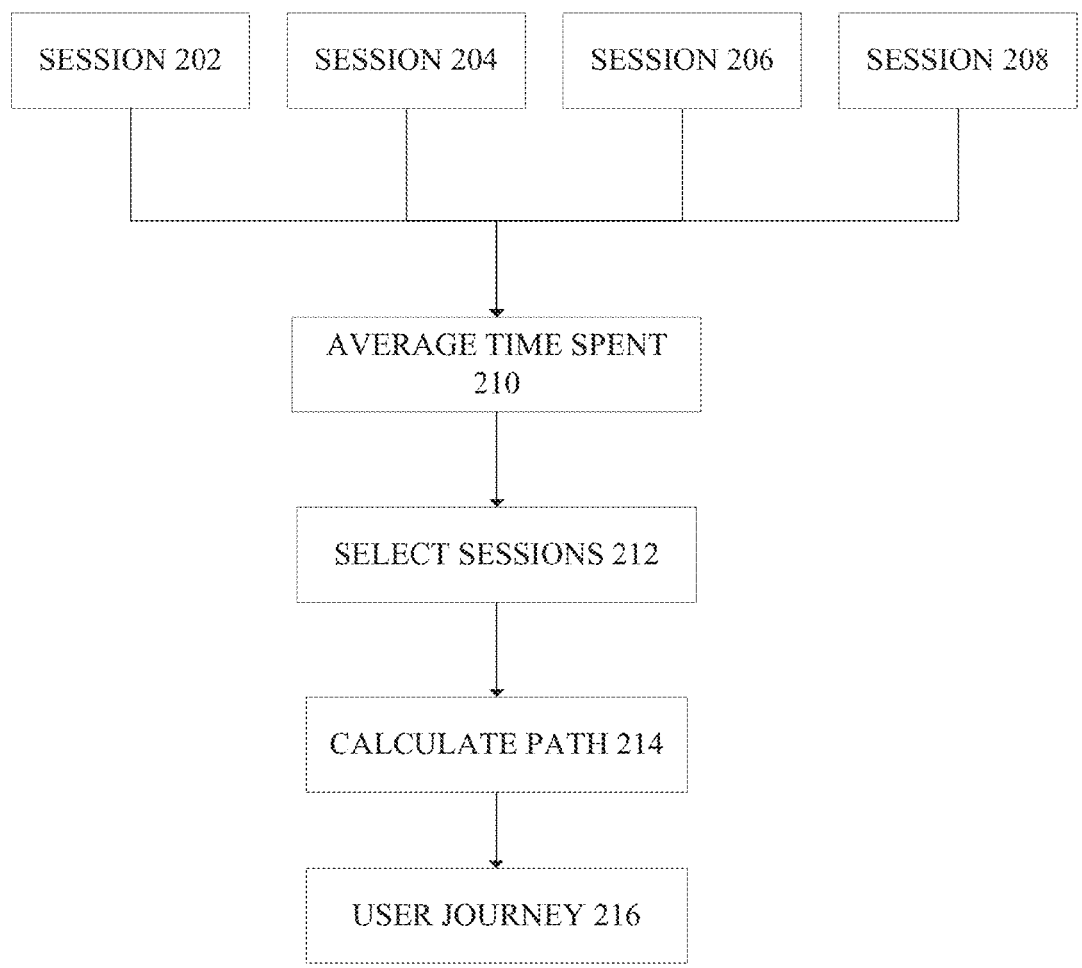
FIG. 2 illustrates an exemplary process for generating a user journey.

The disclosure now turns to FIG. 2, which illustrates an exemplary process 200 for generating a user journey 216. Sessions 202-208 are first processed as input. Sessions 202-208 can be sessions of content at one or more user devices, such as user terminals 102 illustrated in FIG. 1. Sessions 202-208 can include time spent information associated with each of the sessions 202-208. The average time spent 210 for the sessions 202-208 is then calculated. The average time spent 210 can be calculated based on the time spent information associated with each of the sessions 202-208.

A group of sessions 212 is then selected based on the average time spent 210. In some cases, the group of sessions 212 can include those sessions having a respective time spent that is within a range of the average time spent 210. For example, the group of sessions 212 can include those sessions within 10% of the average time spent 210. In other cases, the group of sessions 212 can include a predefined number of sessions having respective time spents that are closest to, or farthest from, the average time spent. For example, the group of sessions 212 can include the 10 sessions having the closest time spents to the average time spent.

A path 214 is then calculated for each of the sessions in the group of sessions 212. Each path can represent the user journey for the associated session. Accordingly, each path can include every event, view, video, gesture, input, and interaction in the session. Each session can also include the timing of each item in the path, such as each event, the location of each gesture, the response for each input, and any other characteristic associated with one or more of the items in the path.

The user journey 216 is then calculated based on the path 214 for each session in the group of sessions 212. In some embodiments, the user journey 216 can represent the most common path for the group of sessions 212, which can be calculated by comparing the path 214 for each session in the group of sessions 212. In other embodiments, the user journey 216 can represent another characteristic path for the group of sessions 212. For example, the user journey 216 can represent the most uncommon path for the group of sessions 212. Indeed, in some cases, the user journey can be calculated for a specific path of events showing some form of abnormality or characteristic, to help identify a problem or error source. For example, the user journey can represent the path of events taken in sessions that encountered errors. This can help illustrate the circumstances existing at the time of the error and even the error triggering event.

Figure 3:
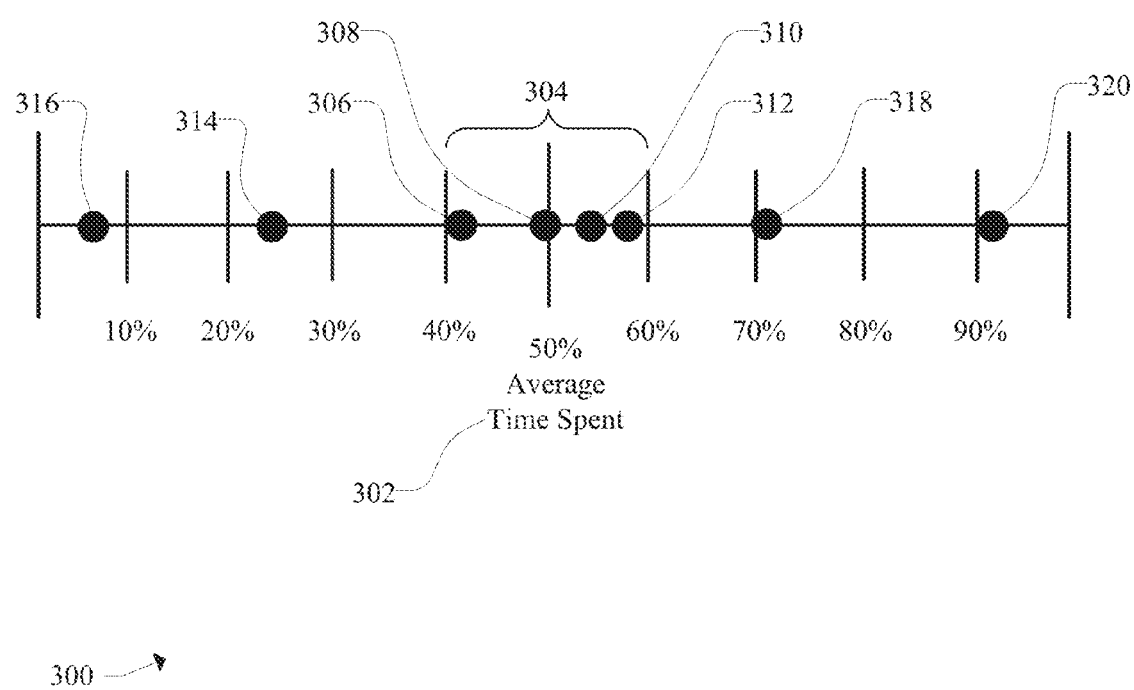
FIG. 3 illustrates exemplary time spent statistics for a group of sessions.

FIG. 3 illustrates exemplary time spent statistics 300 for a group of sessions. The time spent statistics 300 can provide a statistical distribution of time spent information for the group of sessions. The time spent information can include time spent indications 306-320 corresponding to time spent data for associated sessions from the group of sessions. The time spent statistics 300 can also include an indication 302 of the average time spent calculated for the group of sessions. The average time spent can be calculated based on the time spent for each of the sessions in the group of sessions.

The time spent statistics 300 can be used to determine which sessions from the group of sessions should be used to calculate the user journey. For example, the time spent statistics 300 can be used to identify segment 304 of sessions for calculating the user journey. In this example, segment 304 includes those sessions 306-312 having respective time spents within 10% from the average time spent. However, as one of ordinary skill in the art will readily recognize, the segment can be shifted or modified along the distribution of the time spent statistics 300 to change the scope or target of sessions used to calculate the user journey. For example, in some cases, the segment 304 can be increased to include sessions having time spents within 20% from the average time spent.

Figure 4:
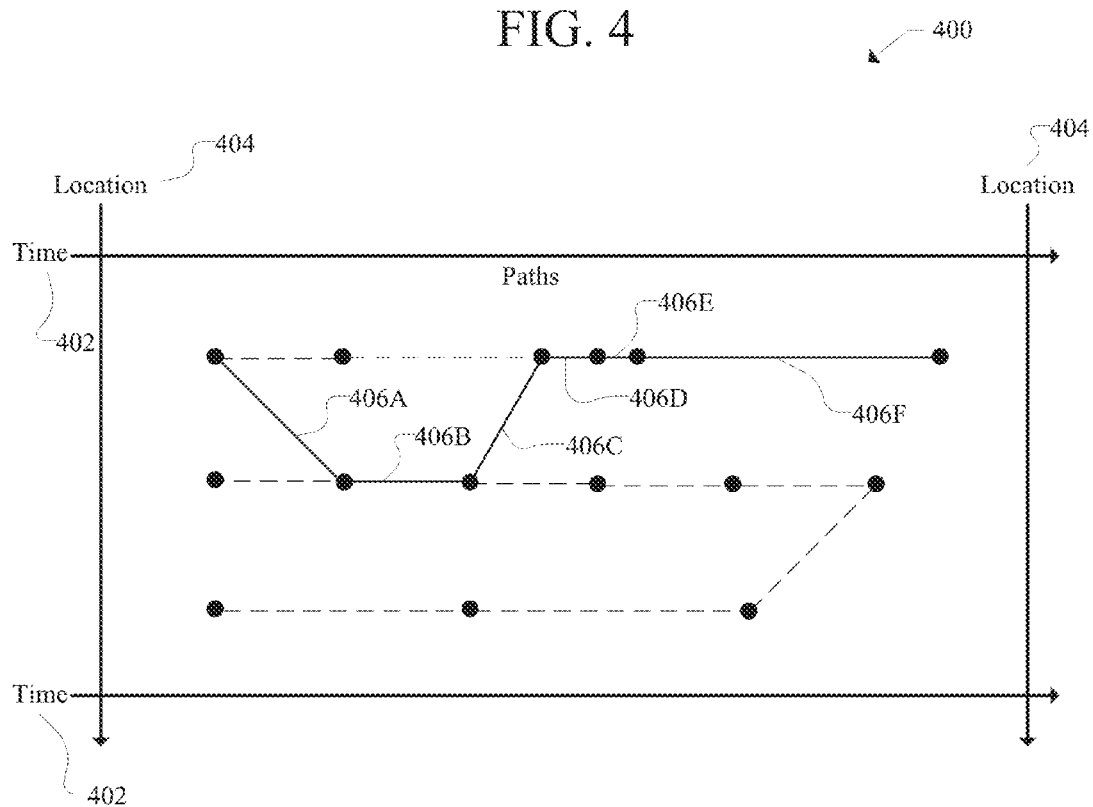
FIG. 4 illustrates an exemplary route map.

FIG. 4 illustrates an exemplary route map 400. The route map 400 can include events and paths mapped for a group of sessions along a time plane 402 and a location plane 404. Thus, the time plane 402 and the location plane 404 can indicate a time and location associated with each of the events in the group of sessions. The various events can be connected to indicate the various paths in the group of sessions. The most common path can also be mapped and identified in the route map 400. In this example, the most common path includes segments 406A-F. Here, the various segments 406A-F in the most common path are depicted using straight lines to identify the most common path from the other paths. However, as one of ordinary skill in the art will readily recognize, the most common path can be identified in other ways. For example, the most common path can be identified using labels, markings, colors, shapes, symbols, etc. Indeed, in some cases, the most common path can be the only path illustrated and, therefore, would not require any special markings to differentiate it from other paths.

The most common path, represented by segments 406A-F, can be identified to create the user journey. The route map 400 can thus indicate the user journey created based on the group of sessions. The user journey can include the events in the most common path; the segments 406A-F, which can represent the progress or movement of the composite session created by the user journey; timing information associated with the events and the composite session; location information; etc. The events in the route map 400 can be represented with varying levels of detail depending on the specific configuration. For example, the route map 400 can include an indication of each event, as well as any information associated with the event, such as time spent information, session ID, event description data, etc. In some cases, the indications of each event in the route map 400 can be user-selectable. Upon user selection, the event indications can be configured to provide additional details and information about the selected event. As a result, the granularity of the information presented can be at least partly controlled by the user.

In some cases, the event indications can also include screenshots or videos associated with the corresponding event. For example, a user can select a specific event depicted in the route map 400 to view a screenshot or video representing what the user was actually looking at during that particular event and/or simulate the users actions at that moment in the session. Other graphical and visual representations are also contemplated herein.

The route map 400 can provide a visual overview of the user journey based on the group of sessions. A user can look at the route map 400 and quickly obtain a visual representation of the most common path of the users in the group of sessions. The user can quickly obtain a visual sense of the events in the most common path, the timing of events in the path, the location of events in the path, and any other characteristic or pattern. Moreover, the amount of information, or the level of detail, that is visually discernible from the route map 400 can be configured according to specific objectives or goals. And while additional details and information can be included in the route map 400 to provide a more descriptive representation of the group of sessions, in some cases, a simplified representation may be better suited to avoid unnecessary distractions from ancillary details. Accordingly, the configuration of the route map 400 can be varied for this purpose.

For example, if the user is only interested in the most common path, he or she may prefer to configure the route map 400 to only depict the most common path, without depicting any other paths. On the other hand, if the user wants to be able to get a visual representation of all the paths in relation to the most common path, the route map 400 can be configured to depict every path in the group of sessions and otherwise highlight, emphasize, or distinguish the most common path.

Figure 5:
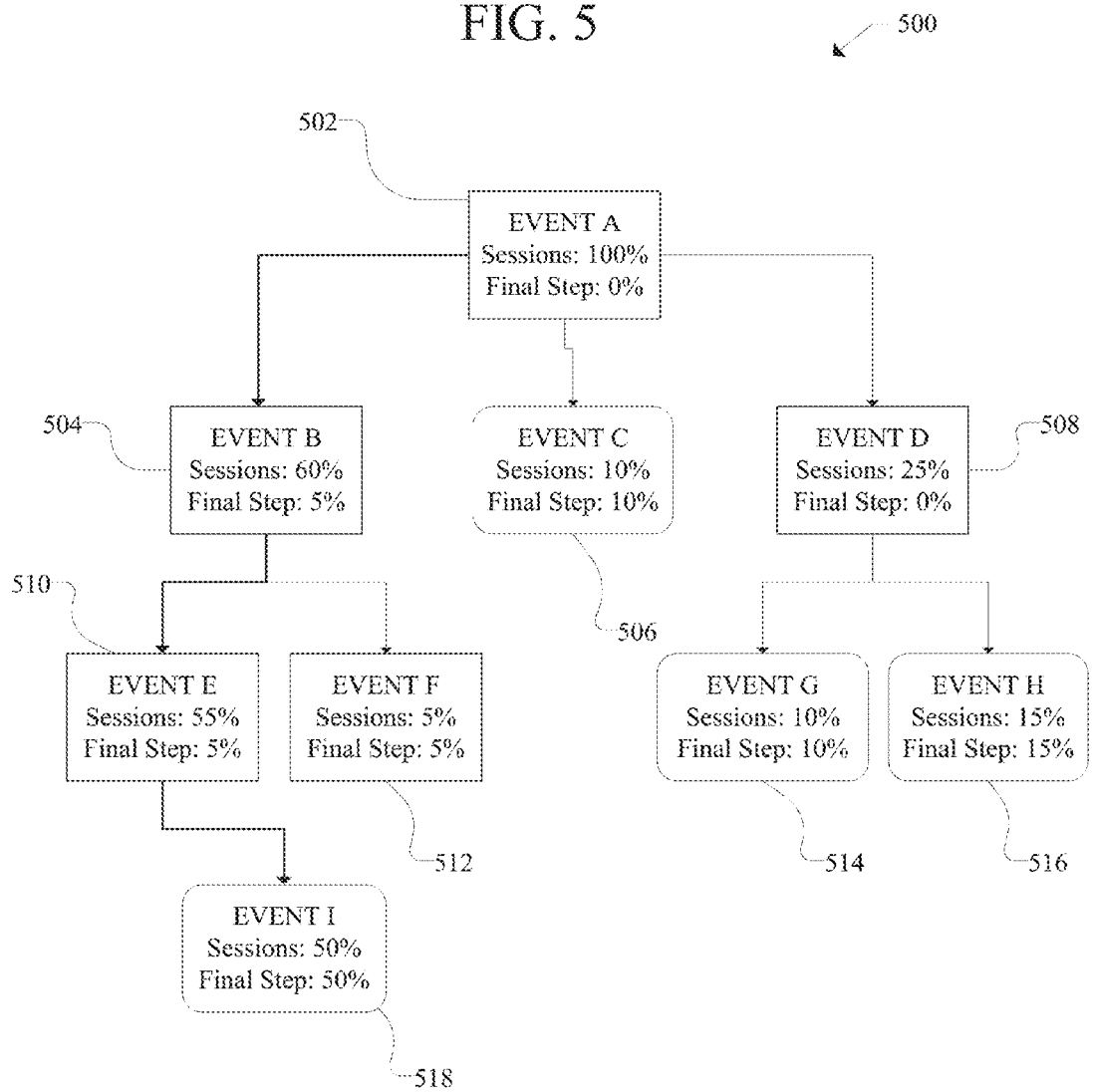
FIG. 5 illustrates an exemplary decision tree showing user journeys.

FIG. 5 illustrates an exemplary decision tree 500 showing user journeys. The decision tree 500 can provide an acyclic, hierarchical, visual representation of user journeys. Moreover, the decision tree 500 can include nodes 502-518, each of which can indicate a view, video, gesture, or event in the user journey.

In some cases, the nodes 502-518 can include the respective names of the views, videos, gestures, or events they represent. The nodes 502-518 can also include screenshots based on the views, videos, gestures, or events they represent. Moreover, the nodes 502-518 can include the percent of sessions which follow the path through the respective nodes 502-518, as well as the percent of sessions which terminate at the respective nodes 502-518. For example, node 504 includes the name of the event, "Event B," indicates that 60% of the sessions follow the path through node 504, and 5% terminate at node 504. Similarly, node 510 includes the name of the event, "Event E," and indicates that 55% of the sessions follow the path through node 510, and 5% of the sessions terminate at node 510. Finally, node 518 includes the name of the node, "Node I," and indicates that 50% of the sessions follow the complete path terminating in node 518.

The percent information can also indicate the most common path of the sessions. For example, the percent information in node 518 indicates that 50% of the sessions terminate at that node and, since this node has the highest percentage for complete paths, it follows that the path terminating in node 518 corresponds to the most common path. The nodes and/or connectors for the most common path can include markings, such as labels, to indicate that the associated path is the most common path.

Moreover, the nodes 502-518 can be connected by connectors, such as arrows, showing the paths for each of the nodes 502-518. In some cases, the arrows can have different weights, colors, shapes, or characteristics based on the commonality or associated percentage of their respective paths. For example, the arrows following the most common path can be thicker or colored red to indicate that they correspond to the most common path.

In some embodiments, the decision tree 500 can include names or icons representing respective gestures or events. Moreover, the names or icons can be superimposed on the respective arrows. Further, the shape or icon of the nodes 502-518 can be based on the type of view, video, gesture, or event they represent. For example, in FIG. 5, nodes 502, 504, 508, 510, and 512 have a squared shape representing a specific type of event, such as a view. On the other hand, nodes 506 and 514-518 have a rounded shape which can represent a different type of event, such as a gesture.

Each of the nodes 502-518 can also include additional information. For example, the nodes 502-518 can include the average KPI (AVGTS, V/V, etc.). As another example, the nodes 502-518 can include specific session information, content information, or screenshots. In some cases, the nodes 502-518 can also include a link to other information, such as statistics, metrics, history, user information, provider information, product information, tags, other decision trees, other sessions, code, or even external information, such as a website.

As illustrated above, the decision tree 500 can provide visual representations and indications of the taxonomy of events in a group of sessions, the relationship of events in the group of sessions, the significance of the events, the user journeys made up by the events, etc. The information depicted in the decision tree 500 is non-limiting, for illustration purposes and can vary as indicated above. One of ordinary skill in the art will readily recognize that the decision tree 500 can have other configurations and additional information.

Figure 6A:
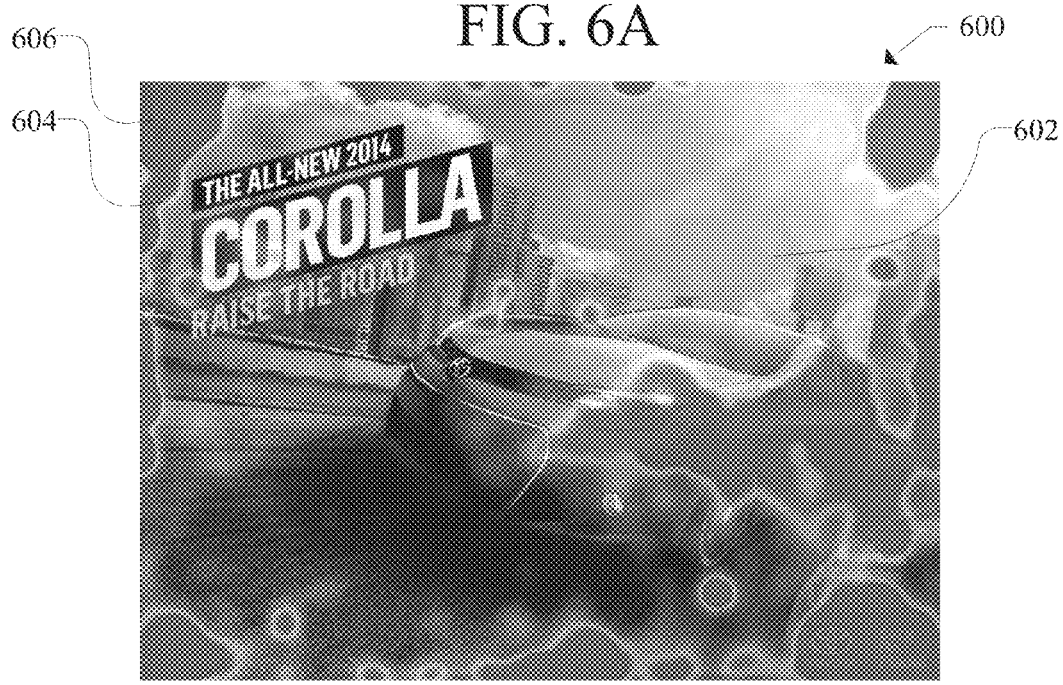
FIGS. 6A and 6B illustrate exemplary heat maps based on screenshots of content.

FIG. 6A illustrates an exemplary heat map 600 based on a screenshot of content. The screenshot can include an advertisement 602 presented to one or more users. The various areas in the advertisement 602 can have varying shades of color based on associated values corresponding to the number of gestures or inputs at the respective areas or locations in the advertisement 602. Thus, the shades of color can provide a visual indication of the specific locations within the advertisement 602 that are associated with an input, such as a gesture, detected from the user or device, as well as the number of detected inputs at the specific locations. For example, the advertisement 602 can include areas having a shading 604 indicating a density of inputs in those areas, and areas having a different shading 606 indicating a different density of inputs in those areas. Here, the distribution of the shades 604, 606 of color in the advertisement 602 can represent the distribution of inputs, and the varying shades 604, 606 can represent the varying numbers of inputs associated with the corresponding locations of the respective shaded areas.

The areas having the lighter shade 604 can represent lower numbers of inputs, and the areas having the darker shade 606 can represent higher numbers of inputs, for example. Moreover, the larger concentration of shades can represent larger concentrations of inputs, and vice versa. The heat map 600 can thus provide a visual representation of the inputs received for the advertisement 602. In some embodiments, the heat map 600 can include additional screenshots. For example, the heat map 600 can include a screenshot for each event in a user journey or path.

While the heat map 600 shows different shades of black and gray, one of ordinary skill in the art will readily recognize that the heat map 600 can instead, or in addition, show different colors, different shapes, different objects, and/or different attributes to represent the different values and statistics. For example, the heat map 600 can depict the different areas and densities using different colors as opposed to different shades. However, for simplicity, the different areas in the advertisement 602 are shown in FIG. 6A using black and white shades.

Figure 6B:
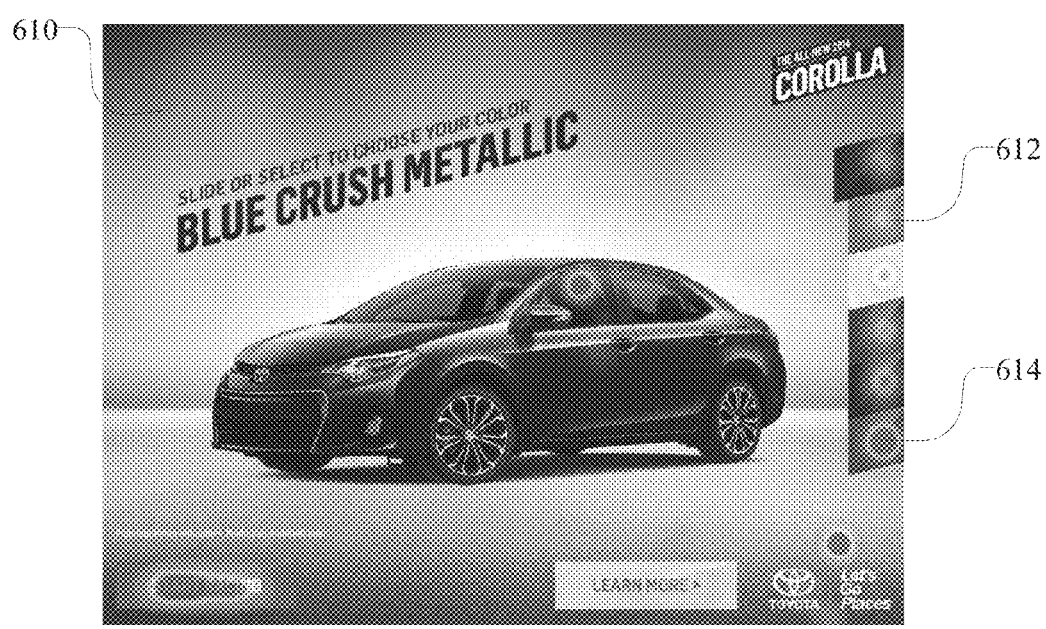

FIG. 6B illustrates another exemplary heat map 608 based on a screenshot of content. The screenshot illustrates an advertisement 610 which contains media content, as well as menus and user interface controls. The advertisement 610 contains shades 612 and 614 to depict the densities of inputs in specific areas of the advertisement 610, as previously described in FIG. 6A. The shading can provide a visual depiction of the number of user selections of the different menus and user interface controls, as well as any graphical elements in the advertisement 610. For example, the shading can illustrate which menus or user interface controls were selected most often, and which were selected least often. The shading can also illustrate which areas of the advertisement were selected most often and which were selected least often. This information can help an advertiser with the placement of graphical elements, menus, and user interface controls, as well as the specific selection of items presented to the user. For example, the shading can illustrate a distribution of inputs that indicates that certain areas of the advertisement 610 tend to be ignored by users, while other areas seem to receive much more attention from those users. Accordingly, the advertiser can shift the placement of elements in the advertisement 610 to maximize the performance of the advertisement 610 by taking advantage of the demonstrated tendencies and propensities of the analyzed human-computer interaction, for example.

In some embodiments, areas in the advertisement 610 having a highest density of user inputs can be shaded in red to indicate the high number of interactions associated with those specific areas, and areas having a lower density of user inputs can be shaded in yellow to indicate the lower number of interactions associated with those areas. The number of colors, shades, and interaction levels depicted in the heat map 608 can vary in some configurations. For example, in some cases, the areas in the advertisement 610 can be divided according to a greater number of groupings to provide a more granular illustration of inputs.

Having disclosed some basic system components and concepts, the disclosure now turns to the exemplary method embodiment shown in FIG. 7. For the sake of clarity, the method is described in terms of a content delivery system 106, as shown in FIG. 1, configured to practice the method. The steps outlined herein are exemplary and can be implemented in any combination thereof, including combinations that exclude, add, or modify certain steps.

The content delivery system 106 first determines an average time spent for sessions associated with a presentation of content (700). The sessions can include any number of sessions associated with the presentation of content and/or the content delivery system. In some cases, the sessions can include one or more groups of sessions selected as input based on one or more factors, such as characteristics, segments, targeting values, etc. The presentation of content can include video, audio, text, or any other type of media content. The average time spent for the sessions can be calculated based on a respective time spent for each of the sessions. For example, the time spent for each of the sessions can be combined, and the combined value used to calculate the average time spent based on the number of sessions included in the calculation.

The content delivery system 106 then identifies a representative group of sessions from the sessions by identifying each of the sessions having a respective time spent within a statistical range from the average time spent for the sessions (702). For example, the content delivery system 106 can calculate a statistical distribution of time spents associated with the sessions, and select a predefined range, such as 10%, from the average time spent as indicated in the distribution, to select the representative group of sessions. The segment of sessions or percentile range within the distribution used to identify the representative group of sessions can be relative to the average time spent or any other point(s) in the distribution, such as the end points representing the lowest and highest percentiles, for example. Moreover, the segment of sessions or percentile range can vary based on specific goals or applications.

The representative group of sessions can be a subgroup of the sessions used as input. For example, the representative group of sessions can be a subgroup of the sessions having the highest likelihood of including the most common path of events for the particular presentation of content. In this sense, the representative group of sessions can refer to the subgroup of sessions estimated or projected to be the most representative sessions of the most common paths of the sessions or user trajectories during the presentation of content.

Next, the content delivery system 106 determines a most common path of events from the representative group of sessions to yield a most common user journey associated with the presentation of content (704). The content delivery system 106 can analyze the statistics associated with each of the events in the representative group of sessions to determine the most common events within the representative group of sessions. The content delivery system 106 can identify the path corresponding to each of the sessions in the representative group of sessions and compare the paths to determine the most common path of events. The most common user journey can be based on the most common path of events, and can represent the most common interactions during the presentation of content.

In some embodiments, the content delivery system 106 can then generate a visual representation of the most common user journey. Here, the content delivery system 106 can present the most common path of events via a graphical user interface, and represent different events and information using various graphical elements, such as icons, images, screenshots, videos, simulations, taxonomies, etc. The content delivery system 106 can also include visual representations of different paths and sessions, and visually depict the various details and relationships of items in one or more user journeys.

Figure 8B:
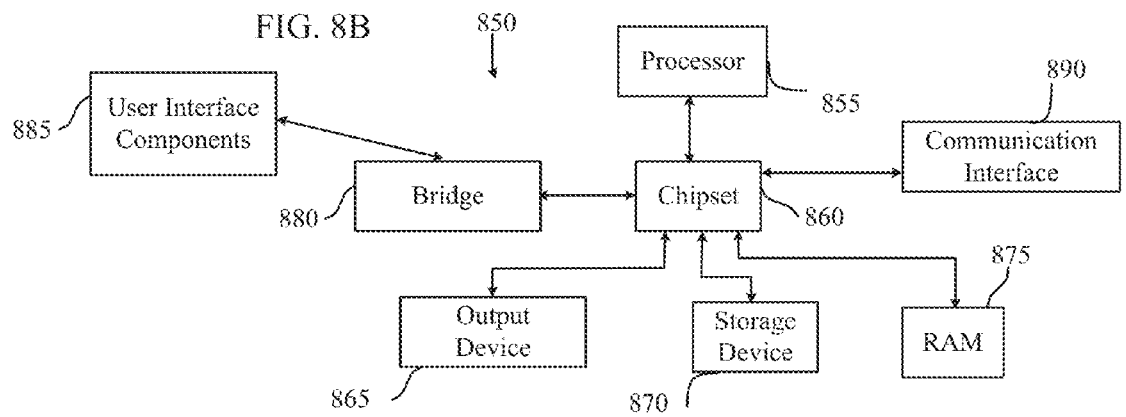
FIGS. 8A and 8B illustrate exemplary system embodiments.
Figure 8A:
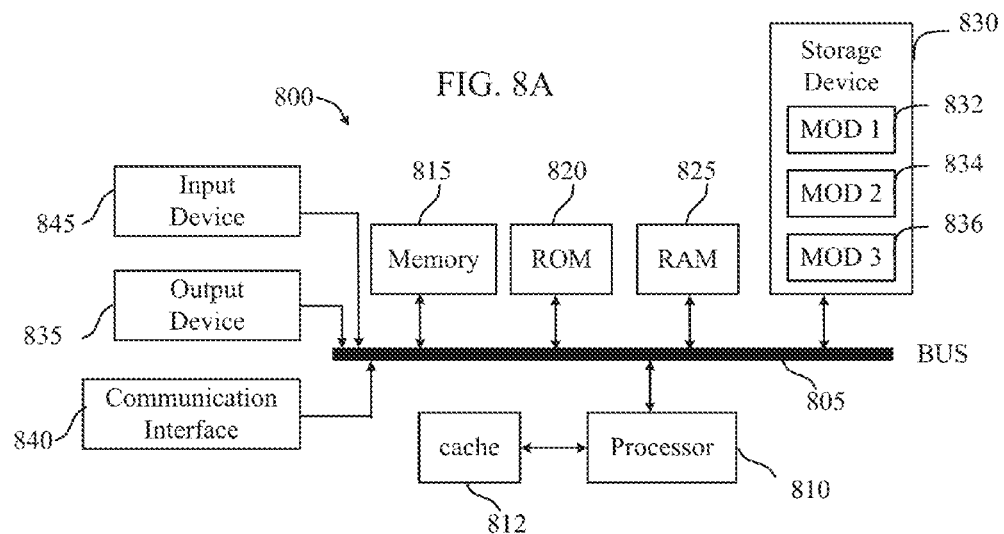

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 675. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
   determining, via a content delivery system, a respective time spent for each of a plurality of sessions associated with a respective presentation of digital content;
   recording, using the content delivery system, gesture events, each gesture event corresponding to a session of the plurality of sessions;
   determining, using the content delivery system, an average time spent for the plurality of sessions;
   based on the respective time spent for each of the plurality of sessions, identifying, using the content delivery system, a subset of sessions from the plurality of sessions having respective time spents that are within a statistical range from the average time spent for the plurality of sessions;
   based on the recorded gesture event for each session from the subset of sessions, generating, using the content delivery system, a respective path of events;
   based on the respective path of events, determining, using the content delivery system, a most common path of events from the subset of sessions to yield a most common user journey associated with the respective presentation of digital content, the most common path of events identifying at least one gesture event of the gesture events; and
   generating, using the content delivery system, a graphical-user interface comprising a visual representation of the most common path of events, wherein the visual representation comprises a selectable indication simulating the at least one gesture event or a result of the at least one gesture event included in the most common path of events.

2. The computer-implemented method of claim 1, wherein determining the average time spent comprises determining a statistical distribution of time spent measurements associated with the plurality of sessions, and wherein the plurality of sessions comprises rich media advertising sessions.

3. The computer-implemented method of claim 1, further comprising presenting the most common user journey via a graphical user interface.

4. The computer-implemented method of claim 3, wherein the events comprise at least one of a user interaction, a view event, an audio event, and a video event, and wherein the user interaction comprises at least one gesture.

5. The computer-implemented method of claim 1, further comprising identifying a threshold number of sessions from the plurality of sessions having an asymmetric path of events, the asymmetric path of events comprising an asymmetric user journey, the asymmetric user journey having a predetermined degree of deviation from the most common user journey.

6. The computer-implemented method of claim 5, wherein the most common user journey comprises a composite session based on the most common path of events from the group of sessions.

7. The computer-implemented method of claim 1, further comprising:
   for each session in the group of sessions including the most common path of events, measuring an average timing between each pair of consecutive events to yield respective timing statistics.

8. The computer-implemented method of claim 7, further comprising
for each session in the group of sessions including the most common path of events, determining an average location of each gesture within the respective presentation of digital content in the session, to yield respective gesture locations.

9. The computer-implemented method of claim 8, wherein the most common user journey comprises a sequence of events based on the most common path of events, the respective timing statistics, and the respective gesture locations.

10. The computer-implemented method of claim 1, further comprising:
clustering the plurality of sessions into characteristic sub-type groups; and
determining the most common path of events for at least one group from the characteristic sub-type groups.

11. The computer-implemented method of claim 1, further comprising:
generating a visual representation of the most common user journey; and
displaying the visual representation via a graphical user interface.

12. The computer-implemented method of claim 11, wherein the visual representation comprises at least one of a decision tree, a user journey playback presentation, a chart, a video, an animation, a heat map, and a route map.

13. The computer-implemented method of claim 1, further comprising identifying an error point associated with at least one of the plurality of sessions based on the most common user journey, the error point comprising at least one of an error source, an error location, an error sequence, an error triggering event, and an error antecedent event.

14. The computer-implemented method of claim 1, further comprising collecting data associated with the plurality of sessions, wherein the average time spent is based on the data.

15. The computer-implemented method of claim 14, wherein the data comprises respective time spent measurements associated with the plurality of sessions, and wherein the average time spent corresponds to an average of the respective time spent measurements.

16. The computer-implemented method of claim 1, wherein the statistical range is based on a threshold deviation from the average time spent.

17. A system comprising:
a content delivery system comprising:
one or more processors; and
at least one computer-readable storage medium having stored therein instructions which, when executed by the one or more processors, cause the one or more processors to perform operations comprising:
collecting data associated with a plurality of sessions, the plurality of sessions being associated with a presentation of content;
recording gesture events, each gesture event corresponding to a session of the plurality of sessions;
based on the data, calculating an average time spent for the plurality of sessions;
identifying one or more sessions from the plurality of sessions having a respective average time spent that is within a statistical range from the average time spent for the plurality of sessions;
based on the recorded gesture for each respective session from the one or more sessions, determining a respective path of events, the respective path of events mapping a path of sequence of events within the respective session;
based on the respective path of events, determining a most common path of events from the one or more sessions to yield a most common user journey associated with the presentation of content, the most common path of events identifying at least one gesture of the gesture events; and
generate a graphical-user interface comprising a visual representation of the most common path of gesture events, wherein the visual representation comprises selectable indication simulating the at least one gesture event or a result of the at least one gesture event included in the most common path of events.

18. The system of claim 17, wherein the statistical range comprises +/−10% of the average time spent.

19. The system of claim 17, wherein the data is collected from at least one advertising unit associated with the plurality of sessions.

20. The system of claim 17, wherein the most common user journey comprises a sequence of events associated with the presentation of content, and wherein the events comprise at least one of gestures, view events, audio events, and video events.

21. The system of claim 20, wherein the computer-readable storage medium stores additional instructions which, when executed by the one or more processors, result in an operation further comprising generating a graphical representation of the most common user journey via a graphical user interface, the graphical representation including indications of average gesture locations and average timings between consecutive events.

22. A non-transitory computer-readable storage medium comprising:
instructions which, when executed by a content delivery system, cause the computing device to:
receive data indicating a time spent for each of a plurality of sessions, the plurality of sessions being associated with a playback or presentation of digital content;
recording gesture events, each gesture event corresponding to a session of the plurality of sessions;
based on the data, calculate an average time spent for the plurality of sessions;
identify one or more sessions from the plurality of sessions, the one or more sessions having a respective average time spent within a range or statistical deviation from the average time spent for the plurality of sessions, to yield one or more representative sessions;
based on the recorded gesture event for each of the one or more representative sessions, generate a respective path of events;
based on the respective path of events, determine a most common path of events for the one or more representative sessions, the most common path of events identifying at least one gesture of the gesture events;
based on the most common path of gesture events, generate a composite session comprising a representative session associated with the plurality of sessions; and
generating a graphical-user interface comprising a visual representation of the most common path of gesture events, wherein the visual representation comprises selectable indications simulating the at least one gesture event or a result of the at least one gesture event included in the most common path of events.

23. The non-transitory computer-readable storage medium of claim 22, storing additional instructions which, when executed by the computing device, result in an operation further comprising presenting a description of the representative session.

24. The non-transitory computer-readable storage medium of claim 22, wherein the composite session comprises a most common user journey associated with the playback of content, and wherein the time spent data is collected from at least one content system associated with the playback of content.

25. The non-transitory computer-readable storage medium of claim 22, wherein the events comprise at least one of gesture events, view events, and video events, and wherein the composite session includes an indication of at least one of an average timing between consecutive events and gesture locations.

* * * * *